United States Patent
Su et al.

(10) Patent No.: US 9,215,170 B2
(45) Date of Patent: Dec. 15, 2015

(54) METHOD OF TRANSPORTING DATA WITH EMBEDDED CLOCK

(71) Applicant: Novatek Microelectronics Corp., Hsinchu (TW)

(72) Inventors: Chia-Wei Su, Hsinchu (TW); Chu-Ya Hsiao, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 14/301,310

(22) Filed: Jun. 10, 2014

(65) Prior Publication Data

US 2014/0294001 A1    Oct. 2, 2014

Related U.S. Application Data

(63) Continuation of application No. 13/555,194, filed on Jul. 23, 2012, now Pat. No. 8,798,076.

(30) Foreign Application Priority Data

Nov. 29, 2011    (TW) .............................. 100143741 A

(51) Int. Cl.
*H04L 12/741* (2013.01)
*H04L 25/02* (2006.01)
*H04L 25/49* (2006.01)

(52) U.S. Cl.
CPC ............ *H04L 45/74* (2013.01); *H04L 25/0272* (2013.01); *H04L 25/4908* (2013.01)

(58) Field of Classification Search
CPC .......... H04N 2201/04793; H04N 2201/04755; H04N 2201/04756
See application file for complete search history.

(56) References Cited

U.S. PATENT DOCUMENTS 8,811,481 B2 *  8/2014  Watanabe et al. ........ 375/240.13
2011/0206143 A1  8/2011  Reinhardt et al.

FOREIGN PATENT DOCUMENTS

| CN | 101330326 | 12/2008 |
|---|---|---|
| CN | 101404558 | 4/2009 |
| DE | 3335564 | 4/1985 |
| DE | 69420414 | 3/2000 |
| EP | 0474241 | 3/1992 |

(Continued)

OTHER PUBLICATIONS

"Office Action of Taiwan Counterpart Application", issued on May 15, 2014, p. 1-p. 3.

(Continued)

*Primary Examiner* — Chandrahas Patel
(74) *Attorney, Agent, or Firm* — Jianq Chyun IP Office

(57) ABSTRACT

A method for transporting data with embedded information is provided. The method is adapted to a data transmission interface for coding an original data and then transporting thereof, including: packing the original data, wherein every N bits form a packet, and N is an integer of at least 4; analyzing whether or not existing a long-run length of long-run data with consecutive same bit data in the packet, wherein when the long-run length is greater than a predetermined length, bit data with a predetermined bit length after an $L^{th}$ bit of the long-run data is toggled; coding the packet to embed a coding information, wherein the coding information determines whether or not the long-run data has been toggled; and transporting the coded packet.

6 Claims, 21 Drawing Sheets

(56) References Cited

FOREIGN PATENT DOCUMENTS

| | | |
|---|---|---|
| TW | I315947 | 10/2009 |
| TW | I319654 | 1/2010 |
| TW | I320546 | 2/2010 |
| TW | I330043 | 9/2010 |

OTHER PUBLICATIONS

Lei Sixiao, "Signal Transmission Technology," Computer Data Communication, Xidian University Press, Dec. 31, 2006, pp. 1.

"Office Action of China Counterpart Application", issued on Mar. 23, 2015, p. 1-p. 6.

\* cited by examiner

Original data

Coded data, M=2, K=1

200  202

Original data N=8

Coded data S=2

Original data N=8

Coded data N=8, S=4

METHOD OF TRANSPORTING DATA WITH EMBEDDED CLOCK

CROSS-REFERENCE TO RELATED APPLICATION

This application is a continuation application of and claims the priority benefit of a prior application Ser. No. 13/555,194, filed on Jul. 23, 2012, now pending. The prior application Ser. No. 13/555,194 claims the priority benefit of Taiwan application serial no. 100143741, filed on Nov. 29, 2011. The entirety of each of the above-mentioned patent applications is hereby incorporated by reference herein and made a part of this specification.

BACKGROUND OF THE INVENTION

1. Field of the Invention

The invention relates to a data packet transporting method. Particularly, the invention relates to a method for transporting data with embedded clock.

2. Description of Related Art

Data transmission is indispensable in operations of electronic products. Regarding a digital display panel, for example, a thin-film transistor liquid crystal display (TFT-LCD) panel, a required data rate of a data transmission interface (reduced swing differential signalling (RSDS) or mini-low-voltage differential signalling (LVDS)) commonly used by a timing controller (TCON) and a source driver of the TFT-LCD panel is far beyond a load level of the current data transmission interface due to various new applications such as solution of motion blur under 120 Hz or three-dimensional (3D) display under 240 Hz, or demand for a slim border. A direct solution is to increase the number of channels in the interface. FIG. 1 is a schematic diagram of a conventional data transmission structure. Referring to FIG. 1, a TCON 100 transmits signals to each of source drivers (D-IC) 106 in a parallel manner through a bus containing data lines 104 and a clock line 102. As a result, electromagnetic interference (EMI) is aggravated, and the demand for slim border cannot be achieved, and even the cost is increased. Therefore, to modify a transmission technique of the interface to increase the data rate of a single channel is obviously a more practical solution.

In a commonly used high-speed serial interface, a clock embedded method is generally used to remove a skew of a clock channel and a data channel, and a point-to-point bus structure is used, as that shown in FIG. 2. FIG. 2 is a schematic diagram of a conventional point-to-point data transmission structure. Referring to FIG. 2, a TCON 120 is connected to each of the source drivers (D-IC) 122 in the point-to-point manner, where a clock signal is embedded in transmitted data, so that it is unnecessary to use an extra clock line. Such method can reduce loss caused by wiring on a substrate due to a matching problem. Regarding the clock embedded technique, a coding method having a direct current (DC) balance and a run length limited characteristics is used to code original data, and such two characteristics facilitate a receiver to easily extract a correct clock phase and frequency, so as to obtain the correct original data. For example, 8b/10b, 4b/5b, . . . , etc. are all belong to such coding method. A main principle thereof is that a coded data string has almost the same appearance rate (the DC balance) of 0 and 1, and the number of consecutive appearance of 0 or 1 is ensured to be smaller than a fixed value (the run length limited), though a certain amount of redundancy has to be added, for example, a coding efficiency (CE) of 8b/10b is 0.8, which represents that every 10 coded data bits only includes the original data of 8 bits, i.e. 2 bits are redundancy or overhead, the clock embedded method using the coding manner has been widely used in various applications.

FIG. 3 is a schematic diagram of a circuit structure for transmitting data by using a conventional 8b/10b coding mechanism. Referring to FIG. 3, parallel data is received by an 8b/10b encoder 130 for an 8b/10b coding. A parallel to serial converter 132 converts coded parallel data into serial data, and the serial data is transmitted through a transmitter 134. FIG. 4 is a schematic diagram of a circuit structure for receiving data by using the conventional 8b/10b coding mechanism. Referring to FIG. 4, a receiver 136 receives the 8b/10b-coded data, and a serial to parallel converter 138 is first used to convert the serial data into parallel data, and the conversion process is implemented in collaboration with operations of a phase/frequency comparator 142, a low pass filter (LPF) 144 and a voltage-controlled oscillator (VCO) 146. The converted parallel data is then decoded by an 8b/10b decoder 140 to obtain the original parallel data.

Although the clock embedded method using the coding manner can achieve a higher data rate, hardware cost and power consumption thereof are obviously increased.

SUMMARY OF THE INVENTION

Accordingly, the invention is directed to a method for transporting data with embedded clock, which has high coding/decoding efficiency and maintains a condition required by high-speed transmission.

The invention provides a method for transporting data with embedded information. The method is adapted to a data transmission interface for coding an original data and then transporting thereof, including: packing the original data, wherein every N bits form a packet, and N is an integer of at least 4; analyzing whether or not existing a long-run length of long-run data with consecutive same bit data in the packet, wherein when the long-run length is greater than a predetermined length, bit data with a predetermined bit length of the long-run data is toggled; coding the packet to embed a coding information, wherein the coding information determines whether or not the long-run data has been toggled; and transporting the coded packet.

The invention provides a method for transporting data with embedded information, which is adapted to a data transmission interface and includes following steps. Original data is received. Then, the original data is packed, where every N bits form a packet, and N is an integer of at least 4. The N bits of each of the packets are divided into a plurality of segments of data. A coding index is inserted between two adjacent segments of data, where the coding index is used to break consecutive same bits of the two adjacent segments of data that exceed a length of one segment of data.

The invention provides a method for decoding a received data packet, adapt to a data receiving interface. The method includes: determining an embedded information carried by the received data packet, so as to determine whether or not a part of bit data of the received data packet with a predetermined bit length has been toggled; toggling the part of bit data of the received data packet when the embedded information indicates that the part of the bit data has been toggled; and removing the embedded information.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

The invention provides a novel clock embedded method, by which besides data transmission with embedded clock is implemented, data error occurred during transmission of long-run data with same bit data is reduced.

Embodiments are provided below to describe the invention in detail, though the invention is not limited to the provided embodiments, and the provided embodiments can be suitably combined.

Figure 5:
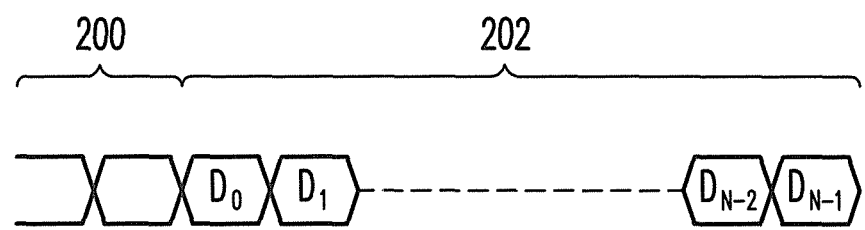
FIG. 5 is a structural schematic diagram of a data packet according to an embodiment of the invention.

FIG. 5 is a structural schematic diagram of a data packet according to an embodiment of the invention. Referring to FIG. 5, the packet includes a data area 202 and a header 200 of original data $D_0, D_1, \ldots, D_{N-1}$. The data area 202 has N bits, where N is any integer and N≥4. The header 200 in the front has M bits, and in the present embodiment, M=2. The header 200 is a clock & toggle index (CTI), which is also referred to as clock/toggle index. Therefore, the packet includes N+2 bits. In the present embodiment, CTI has two values [01] and [10] representing two possibilities, and variation of 0/1 represents clock information. However, if M is greater than 2, the CTI has more other definitions. [01] or [10] represents whether the original data $D_0, D_1, \ldots, D_{N-1}$ has long-run data with same bit data and having a long-run length greater than N/2. The long-run data with same bit data refers to consecutive 1 or 0. When the original data is complied with such condition, a coding step is performed to toggle K bits at the back of the N/2 consecutive 0 or 1, i.e. 0 is toggled to 1 or 1 is toggled to 0. A range of the value K is, for example, 0≤K≤N/2. When a CTI value [10] is inversed to a predetermined value [01], it represents that the original data in the data area 202 has the long-run data with same bit data, and the long-run length is greater than N/2, i.e. the original data is toggled. Conversely, if there is none N/2 consecutive 1 or 0, the CTI is defined to the predetermined value.

Figure 1:
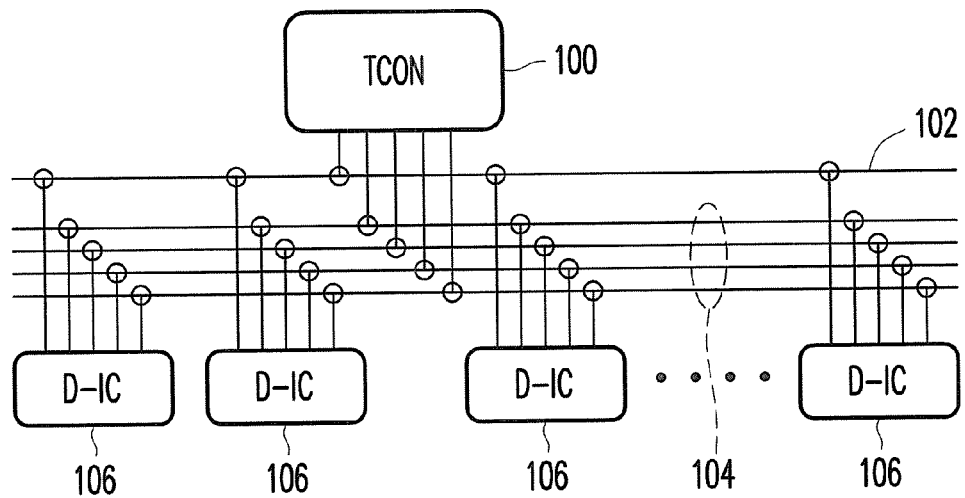
FIG. 1 is a schematic diagram of a conventional data transmission structure.
Figure 2:
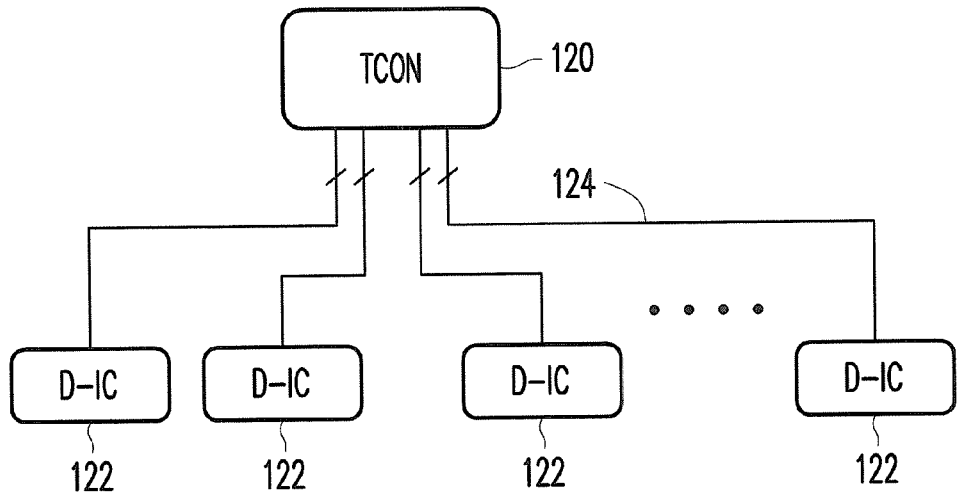
FIG. 2 is a schematic diagram of a conventional point-to-point data transmission structure.
Figure 3:
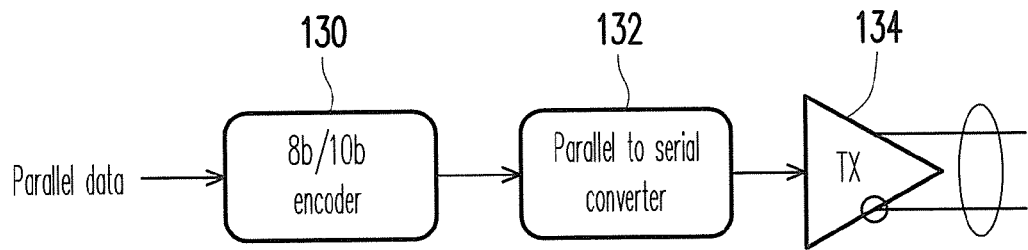
FIG. 3 is a schematic diagram of a circuit structure for transmitting data by using a conventional 8b/10b coding mechanism.
Figure 4:
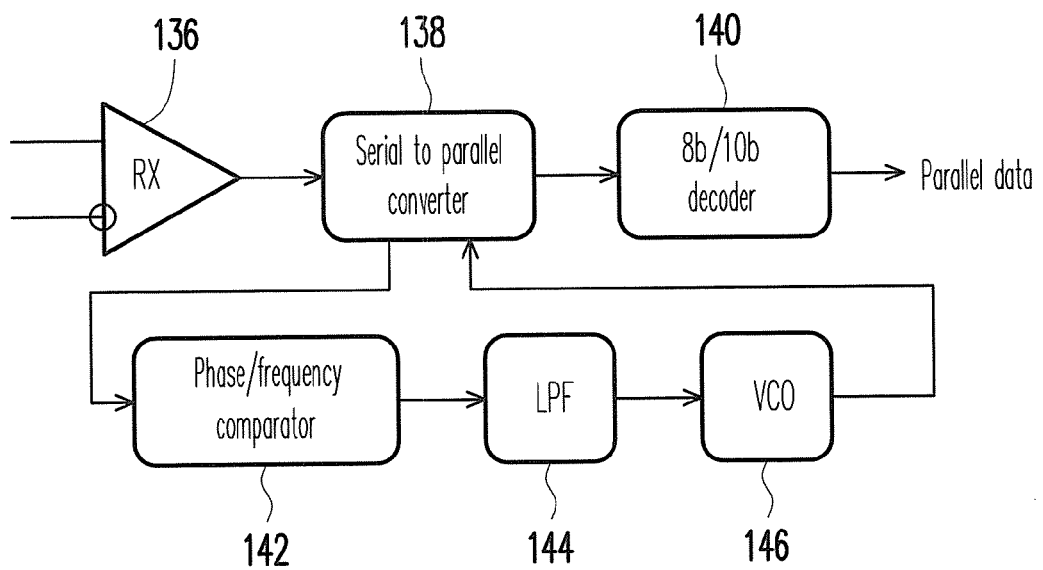
FIG. 4 is a schematic diagram of a circuit structure for receiving data by using the conventional 8b/10b coding mechanism.
Figure 6A:
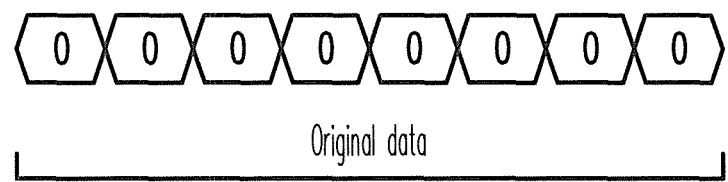
FIGS. 6A-6B are schematic diagrams illustrating a toggle mechanism of packet data with M=2 and K=4 according to an embodiment of the invention.
Figure 6B:
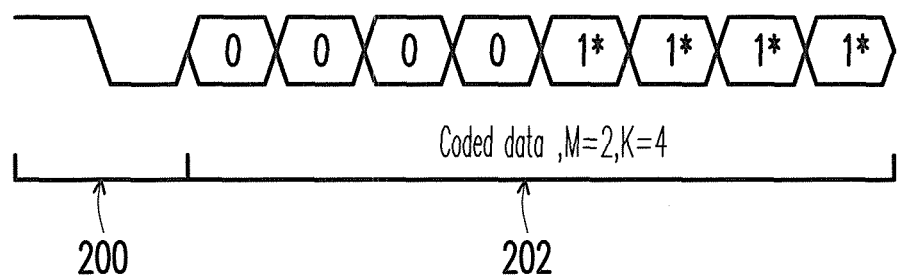

FIGS. 6A-6B are schematic diagrams illustrating a toggle mechanism of packet data with M=2 and K=4 according to an embodiment of the invention. Referring to FIG. 6A, the original data of the present embodiment, for example, has eight bits, i.e. N=8, and it is assumed that the consecutive 8 bits of the original data are all 0. Now, a reference voltage level is continually decreased to cause data error. To avoid the data error, a part of the original data has to be coded, for example, toggled to 1. Referring to FIG. 6B, regarding a coding method of K=4 and N/2=4, 4 bits after a $4^{th}$ bit of the original data are toggled. Since bit data of the original data are all 0, and the toggled bit data is 1, in FIG. 6B, 1* is used to indicate the difference there between. Therefore, the coded data of the data area 202 is toggled. The header 200 is [10], which represents that the data has been toggled. Here, it is assumed that the predetermined value is [01].

Figure 7A:
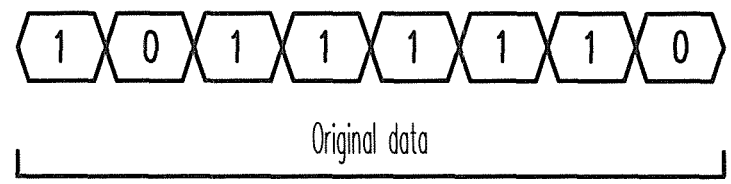
FIGS. 7A-7B are schematic diagrams illustrating a toggle mechanism of packet data with M=2 and K=2, 3, 4 according to an embodiment of the invention.
Figure 7B:
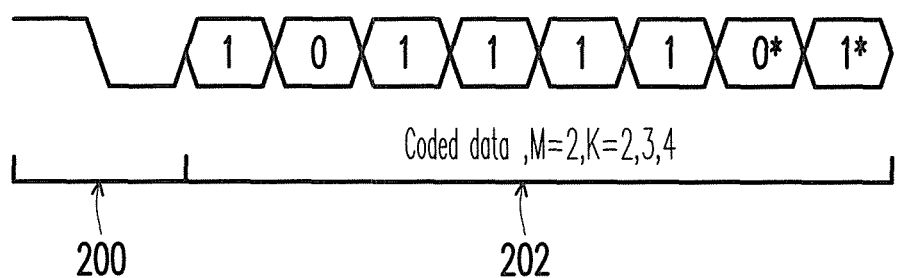

FIGS. 7A-7B are schematic diagrams illustrating a toggle mechanism of the packet data with M=2 and K=2, 3, 4 according to an embodiment of the invention. Referring to FIG. 7A, the original data is, for example, [10111110], which includes five consecutive 1. Referring to FIG. 7B, according to the same coding principle, since the original data has the long-run data with same bit data of 5 consecutive 1, the CTI value of the header 200 is embedded with [10]. In the data area 202, K bits after a $4^{th}$ bit of the long-run data with the same bit data are toggled, and in the present embodiment, K=2. However, when K is 3 or 4, since the range of N=8 is overstepped, descriptions thereof are omitted, the coded data of the present embodiment is the same.

Figure 8A:
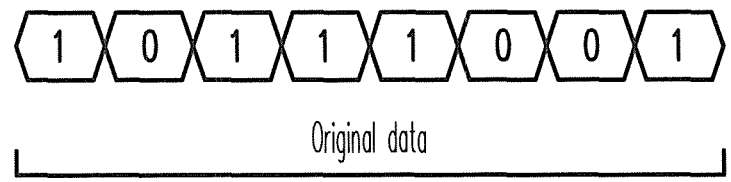
FIGS. 8A-8B are schematic diagrams illustrating a toggle mechanism of the packet data with M=2 and K=4 according to an embodiment of the invention.
Figure 8B:
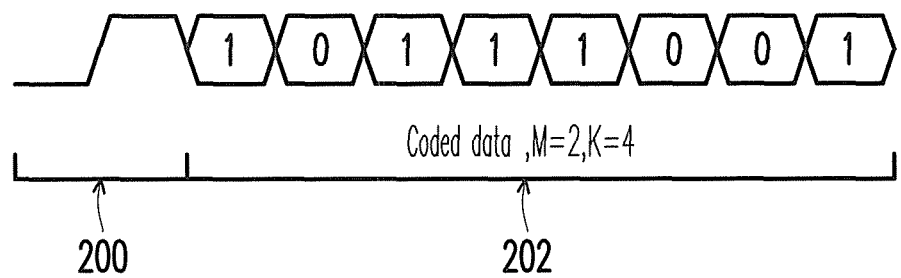

FIGS. 8A-8B are schematic diagrams illustrating a toggle mechanism of the packet data with M=2 and K=4 according to an embodiment of the invention. Referring to FIG. 8A, the original data is, for example, [10111001], and a situation of more than four consecutive 1 or 0 is not appeared. Referring to FIG. 8B, the CTI value of the header 200 of the coded data is the predetermined value [01]. Although K=4, the original data is not toggled.

Figure 9A:
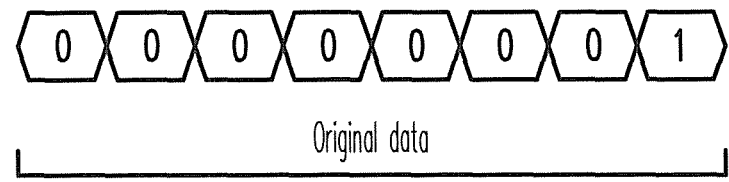
FIGS. 9A-9B are schematic diagrams illustrating a toggle mechanism of the packet data with M=2 and K=1 according to an embodiment of the invention.
Figure 9B:
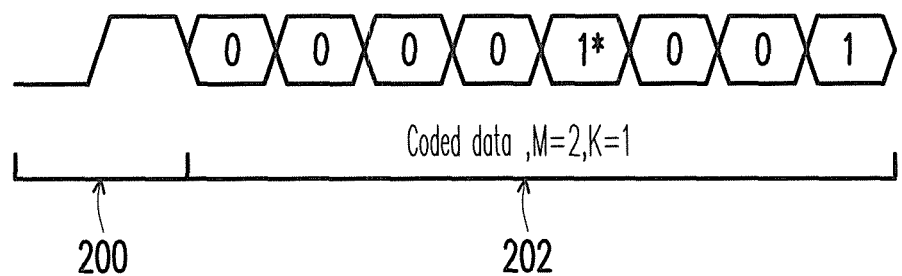

FIGS. 9A-9B are schematic diagrams illustrating a toggle mechanism of the packet data with M=2 and K=1 according to an embodiment of the invention. Referring to FIG. 9A, the predetermined value of the CTI value of the header 200 is [10], and the CTI value corresponding to the toggle operation is [01], and it is assumed that the coding condition is K=1. The original data is, for example, [00000001], which has 7 consecutive 0, so that it is required to be toggled. Referring to FIG. 9B, in this case, the CTI value of the header 200 is embedded with [01] inversed to the predetermined value [10], and the $5^{th}$ bit at 0 is toggled to 1.

Figure 10A:
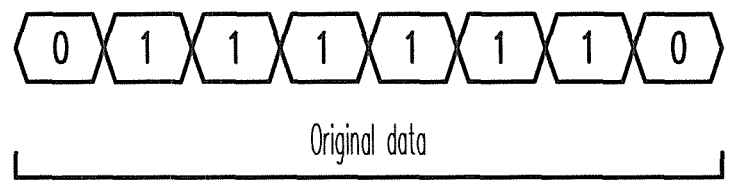
FIGS. 10A-10B are schematic diagrams illustrating a toggle mechanism of packet data with M=2 and K=2 according to an embodiment of the invention.
Figure 10B:
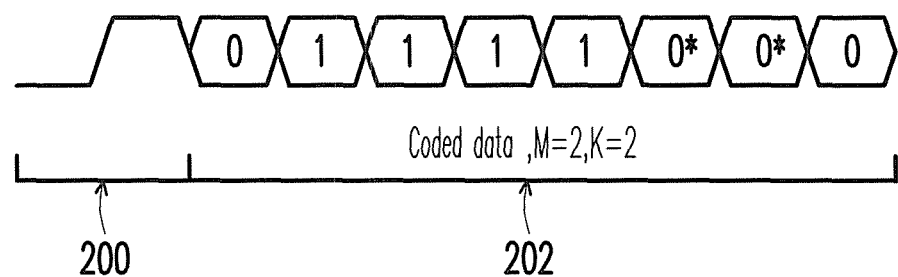

FIGS. 10A-10B are schematic diagrams illustrating a toggle mechanism of the packet data with M=2 and K=2 according to an embodiment of the invention. Referring to FIG. 10A, the original data is, for example, [01111110], which has 6 consecutive 1, so that it is required to be toggled. Referring to FIG. 10B, the CTI value of the header 200 is embedded with [01] inversed to the predetermined value [10], and the $5^{th}$-$6^{th}$ bits at 1 are toggled to 0.

Here, the number of bits of the header 200 is, for example, M=2, though the number can be greater than 2 to define more coding methods. Moreover, in the aforementioned embodiments, the CTI value is embedded in the header of the data area 202. However, it can also be embedded at the tail of the data area 202.

Figure 11:
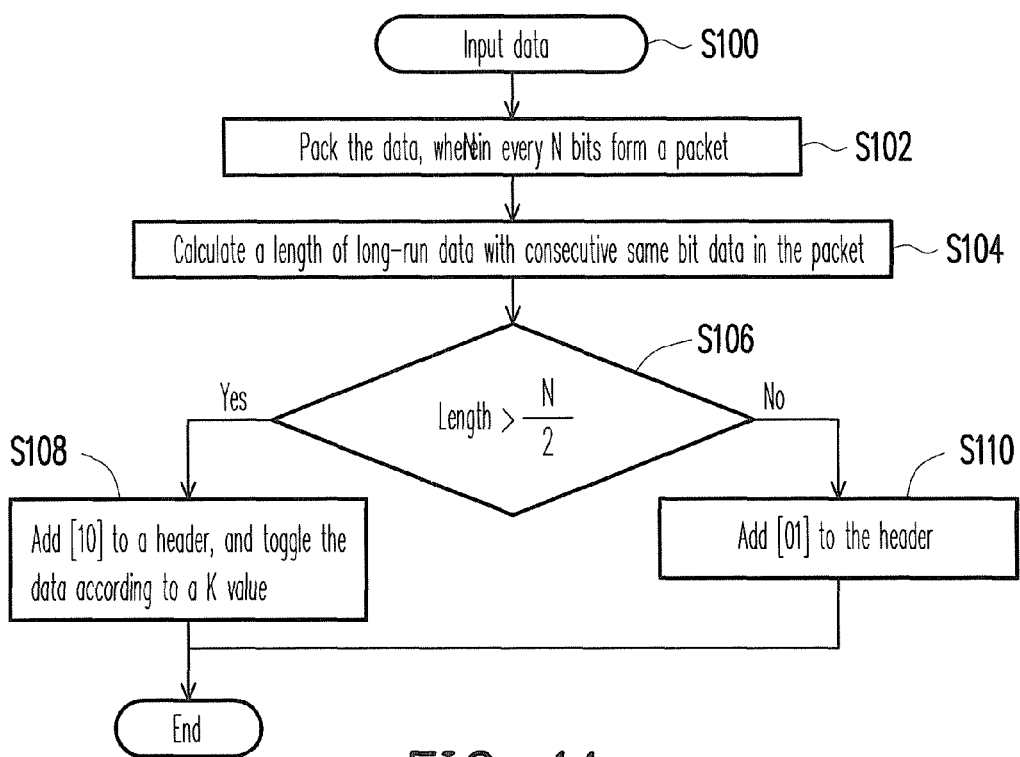
FIG. 11 is a flowchart illustrating a coding algorithm flow of a clock embedded method according to an embodiment of the invention.

FIG. 11 is a flowchart illustrating a coding algorithm flow of a clock embedded method according to an embodiment of the invention. Referring to FIG. 11, according to the aforementioned coding mechanism, the coding flow is described as follows. Before the coding operation, values of N, M, K and CTI are first defined. In step S100, data is input. In step S102, every N bits of the data are packed to form a packet. In step S104, a data length of long-run data with consecutive same bit data in the original bit data of the packet is calculated. In step S106, it is determined whether the data length is greater than N/2. If the data length is greater than N/2, in step S108, the header is embedded to the packet, and the CTI value of the header is set to be different to the predetermined value, for example, [10], and the data is toggled according to the K value to end the coding process. If the data length is not greater than N/2 according to the step S106, in step S110, the header is embedded to the packet, and the CTI value of the header is set to the predetermined value, for example, [01], and the coding process is ended.

Figure 12:
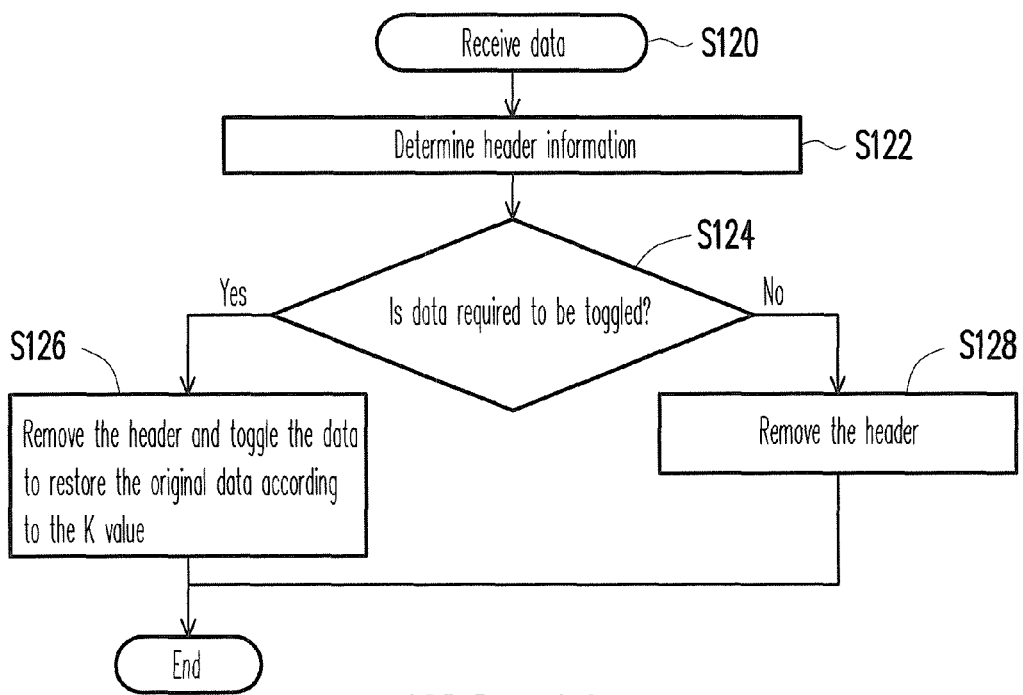
FIG. 12 is a flowchart illustrating a decoding algorithm flow of a clock embedded method according to an embodiment of the invention.

FIG. 12 is a flowchart illustrating a decoding algorithm flow of a clock embedded method according to an embodiment of the invention. Referring to FIG. 12, in step S120, the coded packet data is received. In step S122, information of the header is determined. In step S124, if the toggle operation is required, a step S126 is executed, and if toggle operation is not required, a step S128 is executed. In the step S126, the header is removed, and the data is toggled for restoring to the original data according to the K value, and the decoding operation is ended. In the step S128, the header is removed to end the decoding operation.

Figure 13:
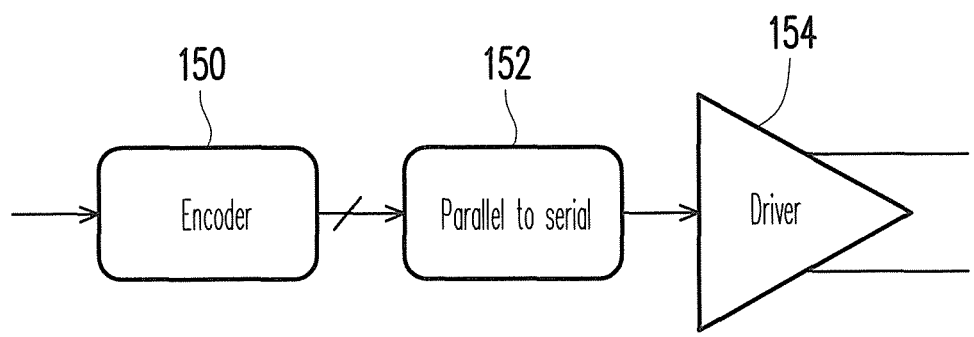
FIG. 13 is a schematic diagram of a clock and data coding transmission circuit according to an embodiment of the invention.

Regarding a hardware circuit, FIG. 13 is a schematic diagram of a clock and data coding transmission circuit according to an embodiment of the invention. Referring to FIG. 13, the original data is input to an encoder 150, and the encoder 150 codes the original data according to the aforementioned packet coding mechanism. The coded packet is converted to serial data by a parallel to serial converter 152, and the serial data is transmitted through a transmitting driver 154.

Figure 14:
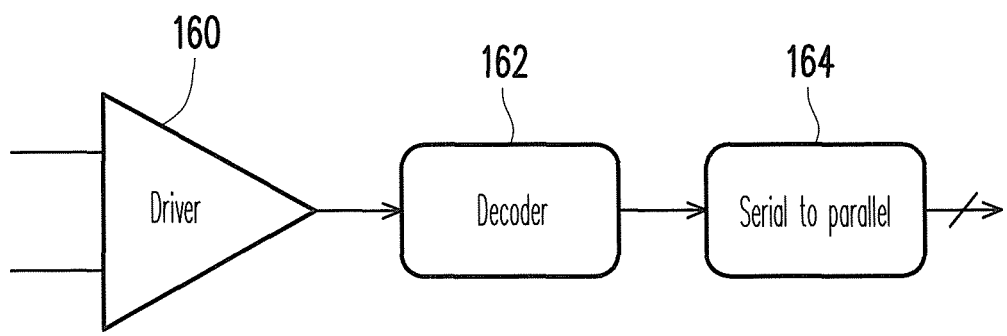
FIG. 14 is a schematic diagram of a clock and data decoding transmission circuit according to an embodiment of the invention.
Figure 15A:
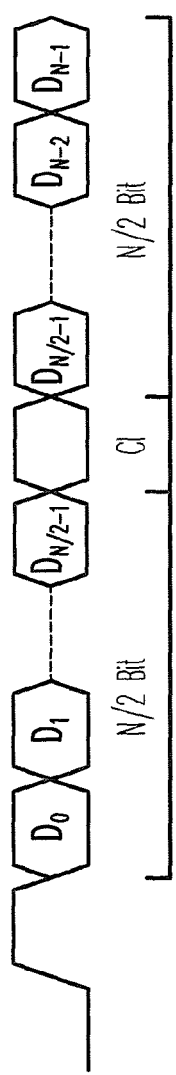
FIGS. 15A-25B are schematic diagrams illustrating a packet data coding mechanism according to a plurality of embodiments of the invention.
Figure 15B:
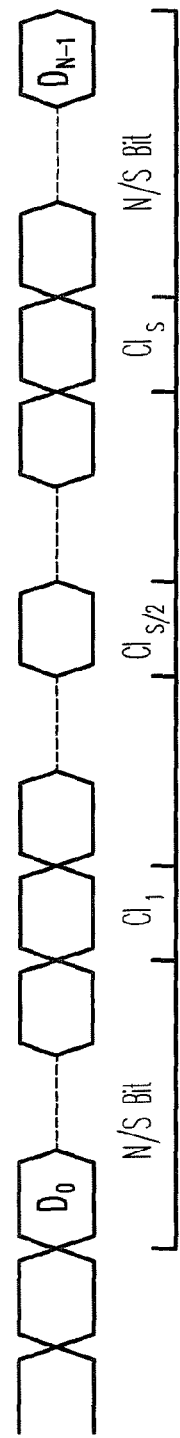

FIG. 14 is a schematic diagram of a clock and data decoding transmission circuit according to an embodiment of the invention. Referring to FIG. 14, regarding a data restoring method based on a circuit structure, a driver 160 receives the coded packet data, and a decoder 162 decodes the coded packet data to obtain the original data and extract a clock signal. However, the restored original data still has a format of serial data, so that a serial to parallel converter 164 is used to convert the restored original data to parallel data, so as to match a subsequent data transmission specification.

Regarding data coding, the invention provides a novel coding method, and a hardware circuit is accordingly simplified.

The invention is not limited to the aforementioned data coding method, and embodiments for coding data are provided below.

According to another clock embedded method, one or a plurality of bits can be inserted to break the multiple consecutive 0 or 1, which is described below.

FIGS. 15A-25B are schematic diagrams illustrating a packet data coding mechanism according to a plurality of embodiments of the invention.

Referring to FIG. 14A, the original data of the packet is represented by $D_o, D_1, \ldots, D_{N-1}$, and N is any integer. The original data $D_o, D_1, \ldots, D_{N-1}$ is divided into S segments of data, where S is an integer, and clock information of [01] or [10] is added to the front of the data, and a coding index (CI) is added between each two adjacent segments of data, for example, $CI_1$ to $CI_S$ are added, and CI is bit data of [0] or [1]. It is determined whether every two adjacent segments of the data packet have consecutive same bits that exceed a length of N/S, i.e. a run length of the consecutive 1 or 0. When the original data matches the above condition, for example, consecutive 1 is appeared, 0 is inserted to the back of each segment of data, for example, 0 is inserted behind every N/S bits. Otherwise, 1 is inserted.

Figure 16A:
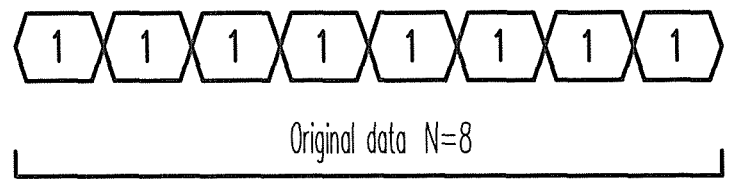
Figure 16B:
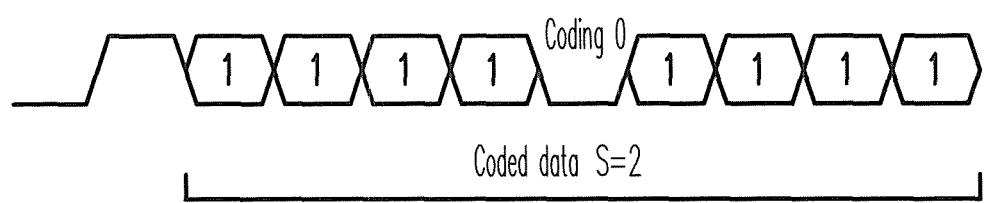

An embodiment is provided below for description, referring to FIG. 16A, a bit length of the original data and a number of the divided segments are, for example, N=8 and S=2, and data of 8 consecutive 1 is taken as an example. Referring to FIG. 16B, the packet of the coded original data is changed to [111101111], where after 4 bits, i.e. after 8/2=4 bits, the CI of 0 is inserted to break the 8 consecutive 1.

Figure 17A:
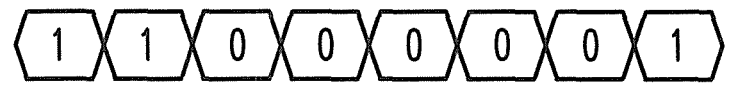
Figure 17B:
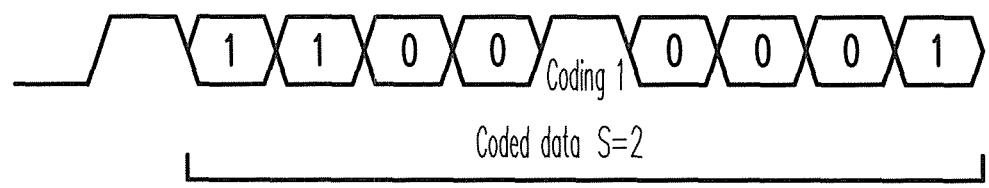

Referring to FIG. 17A for another embodiment, the original data is [11000001], where N=8 and S=2. Referring to FIG. 17B, the packet of the coded original data is changed to [110010001], where the inserted CI is 1, which is used to break the 5 consecutive 0.

Figure 18A:
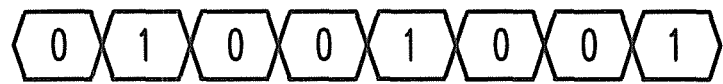
Figure 18B:
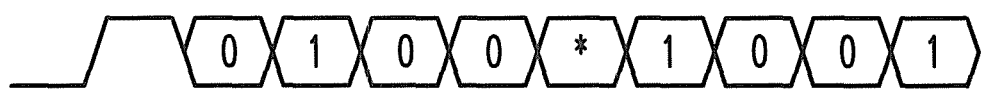

Referring to FIG. 18A for another embodiment, the original data is [01001001], where N=8 and S=2. Referring to FIG. 18B, the packet of the coded original data is changed to [0100*1001], where the CI is *, which represents that the CI can be 1 or 0 since a situation of more than four consecutive same bits is not appeared, and the original data is not required to be broken, so that either 0 or 1 can be inserted.

Figure 19:
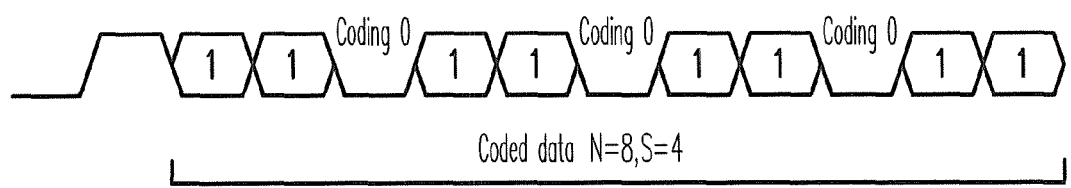

Referring to FIG. 19 for another embodiment, the original data is [11111111], where N=8 and S=4. In this embodiment, the packet of the coded original data is changed to [11011011011]. Since the data is divided into 4 segments, every two bits has one CI. In this embodiment, the values of the CIs are all 0. The CI can be 1 or 0 if a length of the consecutive same bits does not exceed a length of one segment.

Figure 20A:
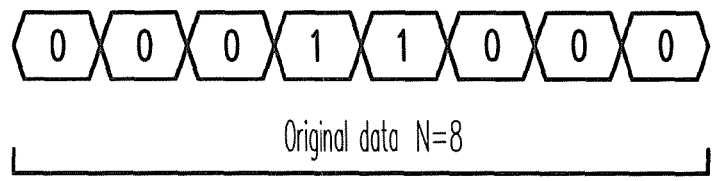
Figure 20B:
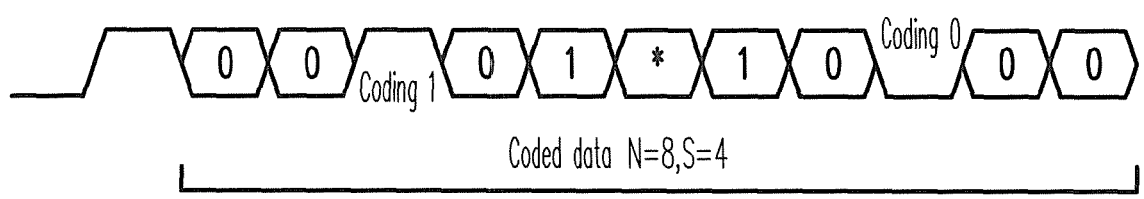

Referring to FIG. 20A for another embodiment, the original data is [00011000], where N=8 and S=4. Referring to FIG. 20B, the packet of the coded original data is changed to [00101*10100], in which $CI_{1-3}$ are respectively [1], [*] and [1], where * represents that the CI can be 1 or 0.

A novel clock embedded method can be deduced according to the aforementioned two methods, which is described as follows.

Figure 21A:
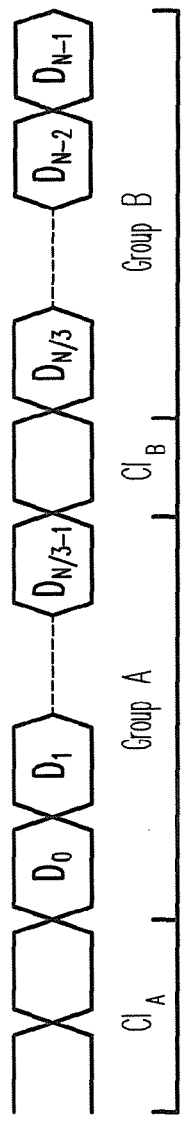
Figure 21B:
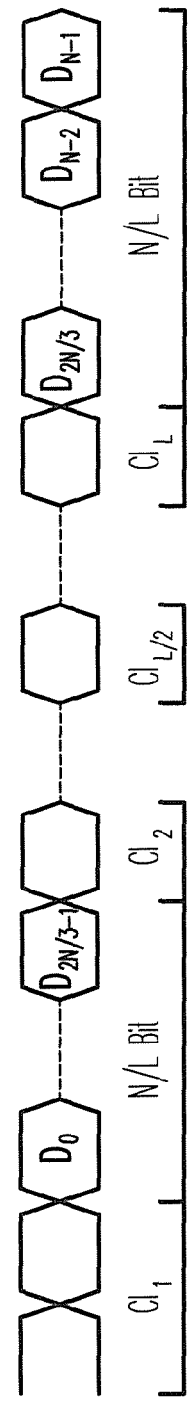

The original data of the packet is represented by $D_0, D_1, \ldots, D_{N-1}$, and N is any integer. According to the coding method shown in FIGS. 15-20, the original data is divided into L segments, so that [0] or [1] is inserted behind every N/L bits, where L is an integer. The front M bits (for example, M=2) are coding index. Referring to FIG. 21A, in case of a combined coding method, for example, L=2, the data is divided into two groups, i.e. a group A and a group B. The front $CI_A$ is the coding index. The front N/3 bits are taken as the group A, and the other bits are taken as the group B, and $CI_B$ is inserted between the group A and the group B. It is determined whether the data has consecutive same bits that exceed a length of N/S, i.e. a run length of the consecutive 1 or 0, so as to determine the value of $CI_B$. The group B is processed according to the toggle mechanism of FIGS. 7A-10B. Generally, referring to FIG. 21B, the data can be divided into L groups. CI is inserted to the front of each group of data, where $CI_1$ is used for data coding, and the remained (L−1) groups are coded according to the data toggle method.

Figure 22A:
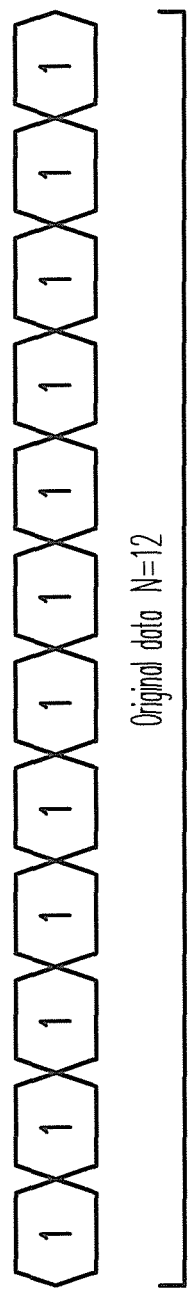
Figure 22B:
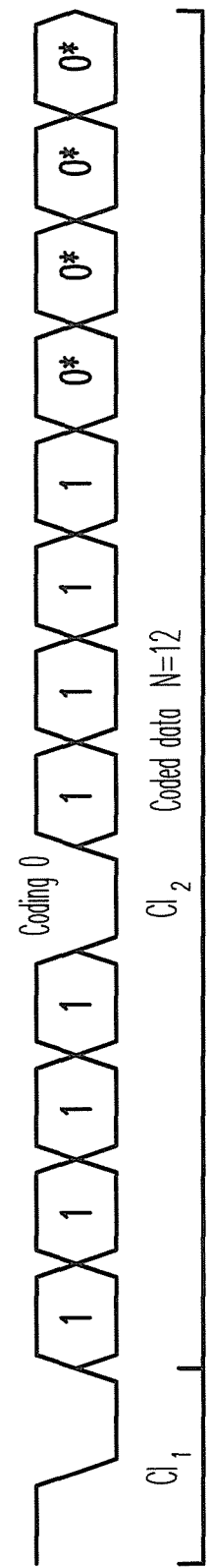

Referring to FIG. 22A for another embodiment, where N=12 and L=2, and data with 12 consecutive 1 is taken as an example. Referring to FIG. 22B, the packet of the coded data is changed to [1111011110000], in which $CI_1$ is [10] and $CI_2$ is [0] to break the data with consecutive 1. Regarding the second group of data after the first group, according to the toggle method, the last 4 bits are toggled to 0, where * refers to that the bit is toggled.

Figure 23A:
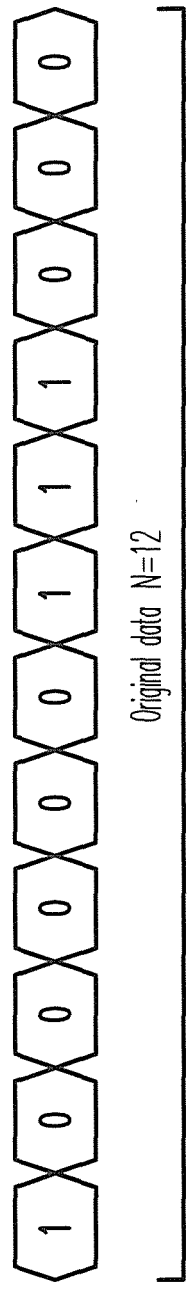
Figure 23B:
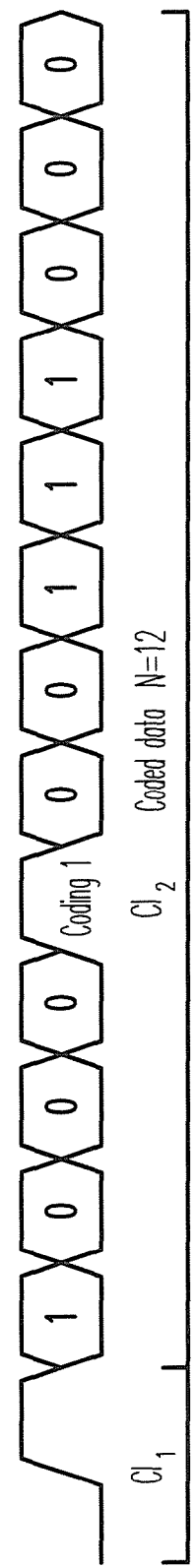

Referring to FIG. 23A for another embodiment, the original data is [100000111000], where N=12 and L=3. Referring to FIG. 23B, the packet of the coded original data is changed to [1000100111000], in which $CI_1$ is [01] and $CI_2$ is [0].

Figure 24A:
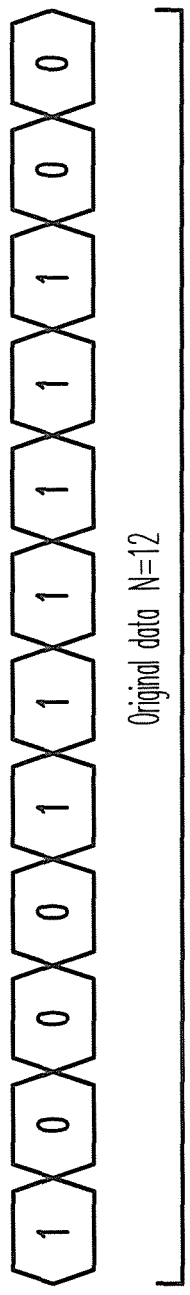
Figure 24B:
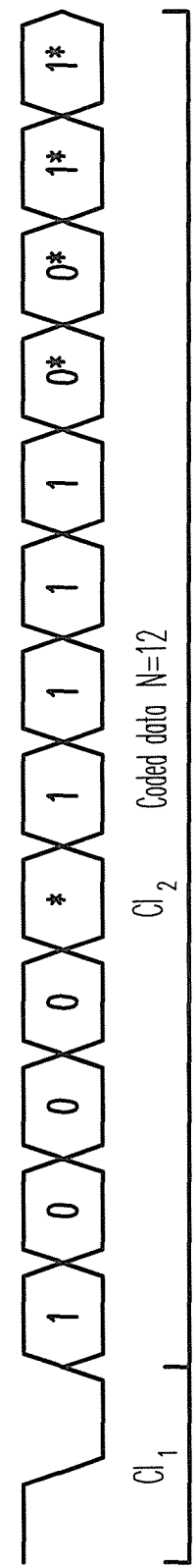

Referring to FIG. 24A for another embodiment, the original data is [100011111100], where N=12 and L=3. Referring to FIG. 24B, the packet of the coded original data is changed to [1000*11110011], in which $CI_1$ is [10] and $CI_2$ is [*], which can be 1 or 0. Here, the second group of data after the first group of data is complied with the toggle condition, so that this group of data is toggled, and [10] of $CI_1$ represents that the data is toggled.

Figure 25A:
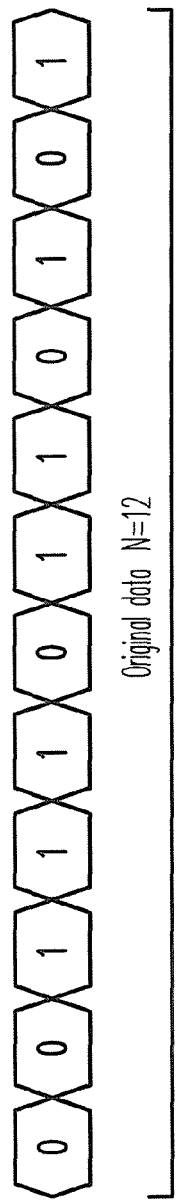
Figure 25B:
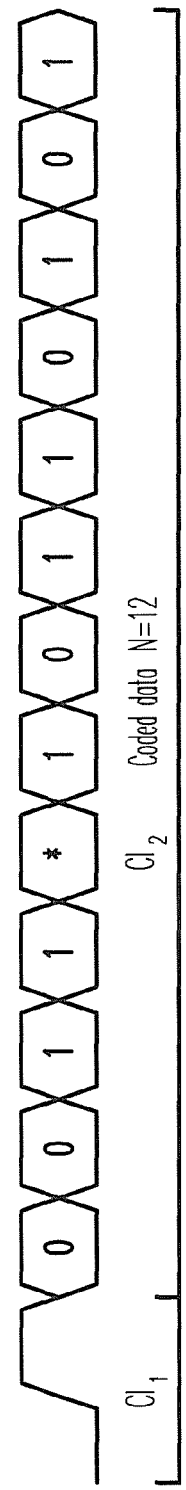

Referring to FIG. 25A for another embodiment, the original data is [001110110101], where N=12 and L=3. Referring to FIG. 25B, the packet of the coded original data is changed to [0011*10110101], in which $CI_1$ is [01] and $CI_2$ is [*], which can be 1 or 0. Here, [01] of $CI_I$ represents that the data is not toggled.

The invention provides several method for coding data, and besides the toggle mechanism and the insertion mechanism are used, the two methods can be combined. In case of the combined mode, data can be divided into a plurality of groups, where some groups apply the insertion mechanism, and the others apply the toggle mechanism.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for transporting data to a display device, comprising:
    receiving an image data having a first part data and a second part data;
    setting a coding information into a header, wherein the coding information indicates whether the second part data in bits is to be inverted or not;
    coding the image data according to the coding information; and
    packing the header and the coded image data to a packet for transporting to the display device.

2. The method for transporting data to the display device as claimed in claim 1, wherein the image data has N bits, the first part data and the second part data respectively have N/2 bits, N is an integer.

3. The method for transporting data to the display device as claimed in claim 1, wherein when a bit number of the image data with consecutive same bit value is greater than a predetermined number, the second part data is inverted.

4. The method for transporting data to the display device as claimed in claim 3, wherein the predetermined number is N/2, N is a bit length of the image data.

5. A method for driving a display device, comprising:
    receiving a packet of coded data which has a header and an image data;
    determining a coding information of the header to acquire a decoded data, wherein the coding information indicates whether a part of bits of the image data are inverted or not; and
    outputting the decoded data to drive the display device.

6. The method for driving the display device as claimed in claim 5, wherein the image data are inverted N/2 bits, N is a bit length of the image data.

* * * * *